May 22, 1956 A. L. BROCKWAY, JR 2,747,096
PULSE REPETITION FREQUENCY DOUBLING CIRCUIT
Filed June 7, 1951
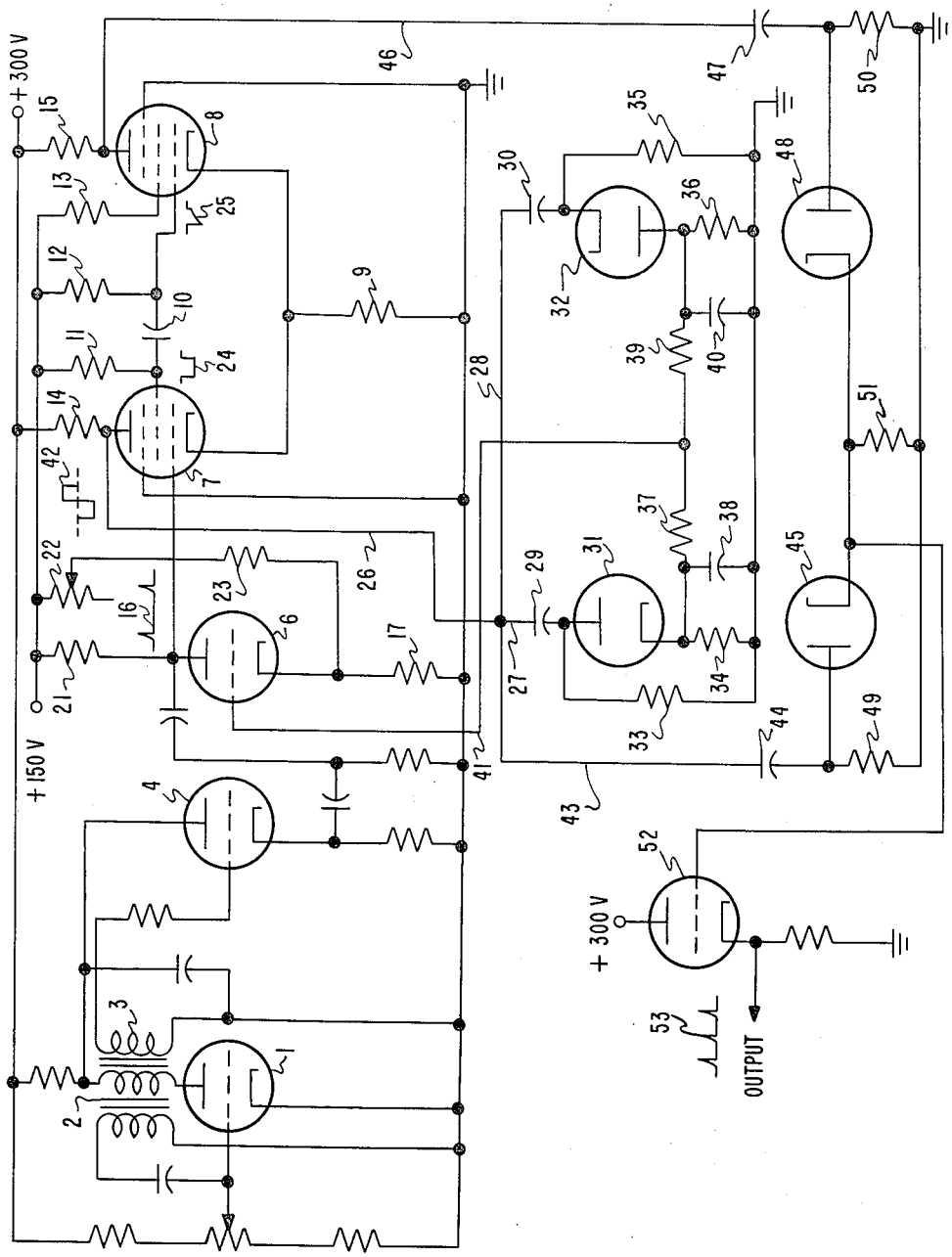
ARTHUR L. BROCKWAY, JR.
*INVENTOR.*
BY
*Killman and Keist*
*Attorneys.*

2,747,096
Patented May 22, 1956

2,747,096
PULSE REPETITION FREQUENCY DOUBLING CIRCUIT

Arthur L. Brockway, Jr., Baltimore, Md., assignor to Bendix Aviation Corporation, Towson, Md., a corporation of Delaware Application June 7, 1951, Serial No. 230,409

6 Claims. (Cl. 250—36)

This invention relates to frequency doubler circuits and more particularly to circuits for the doubling of the repetition frequency of trains of spaced pulses.

With this type of waveform difficulty has arisen in previous attempts to provide a means which would double the pulse frequency while maintaining equal the duration of alternate pulse periods.

This difficulty became accentuated with variations in the pulse repetition frequency of the basic pulse train. Thus, while it might be possible to achieve satisfactory doubling so long as a steady pulse repetition frequency could be maintained in the basic pulse train, any variation in this frequency resulted in alternate pulse periods of unequal duration in the frequency doubled waveform.

It is an object of this invention to double the pulse repetition frequency of a pulse train in such a manner that the pulse periods of the resulting wave train are of uniform duration.

It is a further object of the invention to accomplish the foregoing result over a considerable range of pulse repetition frequency variation in the basic pulse train.

These and other objects and advantages of the invention are accomplished by a circuit in which the basic pulse train is utilized to trigger a monostable multivibrator. The output of the multivibrator, as taken from a single point, is subjected to rectification in a pair of peak rectifying circuits connected to provide outputs of opposite polarity. These outputs are differentially combined and the resultant voltage is applied as bias voltage to the multivibrator. The frequency doubled output is obtained by additively combining pulses derived from the outputs of both stages of the multivibrator.

The single figure of the drawing is a schematic circuit diagram of a circuit constituting a preferred embodiment of the invention.

In the drawing there is shown a vacuum tube 1 having its grid and plate circuits coupled by a transformer 2 in a manner to form a conventional single swing blocking oscillator. This is an illustrative example of a source of the basic pulse train, the repetition frequency of which is to be doubled, it being understood that any desired source of pulses which will produce a uniform pulse train of the desired form may be used.

The output of the blocking oscillator is taken from the tertiary winding 3 of the transformer 2 and applied to the control grid of a vacuum tube 4. This tube is connected as a cathode follower, the output being coupled from the cathode to the plate of a vacuum tube 6 and to the control electrode of a pentode 7.

The latter tube is connected to a second pentode 8 to form a multivibrator circuit of the monostable type. The cathodes are directly connected and their junction is grounded through a resistor 9. The screen grid of tube 7 is connected to the control grid of tube 8 through a condenser 10. Each terminal of condenser 10 is connected to a 150 volt source of positive potential through resistors 11 and 12, respectively. The screen grid of tube 8 is connected to the same source through resistor 13. The plates of tubes 7 and 8 are connected to a source of 300 volts positive through resistors 14 and 15, respectively.

A resistor 21 connects the plate of tube 6 to the 150 volt source and a variable biasing means for the tube is provided, consisting of a potentiometer 22 and resistors 23 and 17 serially connected between the 150 volt source and the ground reference.

In the operation of the multivibrator circuit, the screen grid of the tube 7 acts as a plate element with the resistor 11 functioning as a plate load. The tube 8 is normally conducting while the tube 7 is biased to cut-off. The voltage developed across the resistor 9, by the plate current of tube 8, and the voltage appearing on the plate of the tube 6, provide a biasing potential between the control grid and the cathode of the tube 7, such that the tube 7 is biased to cut-off. When a positive voltage pulse, as illustrated by a waveform 16, appears on the control grid of the tube 7, the potential on the screen grid, which is functioning as a plate element, decreases. This voltage transient is coupled to the control grid of the tube 8 by the capacitor 10. As the transient is negative in polarity, tube 8 is cut-off and the voltage drop existing across the resistor 9 diminishes because of the absence of the plate current of the tube 8. The biasing voltage existing between the grid and cathode of the tube 7 is now such that the tube 7 is conducting. Because the tube 7 is conducting, the potential appearing on the screen grid thereof remains in a decreased state as illustrated by a waveform 24. The biasing voltage existing between the grid and cathode of the tube 7 will determine the level of the voltage on the screen grid of the tube 7. Instantaneously, the capacitor 10 cannot accept a charge and consequently the potential existing on the control grid of the tube 8 must change in the same sense and to the same degree as the potential on the screen grid of the tube 7. A charge-up circuit is provided for the capacitor 10 by the resistors 11 and 12 and therefore the potential on the control grid of the tube 8 rises exponentially, in accordance with the values chosen for the capacitor 10 and the resistors 11 and 12, as is illustrated by a waveform 25. As this potential rises, a point is reached at which the plate current of the tube 8 will flow. The length of time required to reach this point will be determined by the change in the voltage on the screen of the tube 7, the time constant of the charge-up circuit, and the voltage developed across the resistor 9. When this point has been reached, the multivibrator has returned to its normal operating condition.

A waveform 42 of the voltage appearing on the plate of the tube 7 is rectangular in character with its symmetry determined by the choice of components, operating potentials and frequency of triggering pulses. As a source of potential for frequency doubling purposes, the durations of the rectangular excursions must be identical.

The durations of the rectangular excursions may be varied by varying the change in the voltage on the screen grid of the tube 7 as was explained supra. This change may be varied by varying the level of the D. C. voltage on the grid of tube 7. As an example, assume that it is desirable to increase the duration of the excursion occurring during conduction of the tube 7. This means that the tube 7 must conduct for a greater length of time. For the tube 7 to continue to conduct, the tube 8 must remain biased to plate current cut-off. This is accomplished by making the control grid of tube 7 more positive so that the change in the voltage on the screen grid will be greater and a longer period of time will be required for the level of the potential on the grid of the tube 8 to increase to the point where plate current will begin to flow. Therefore, to increase the duration of the conducting excursion, the level of the D. C. potential on the control grid of the tube 7 must become more positive.

The method by which the D. C. voltage on the grid of the tube 7 is varied to maintain symmetry of the waveform 42 involves the utilization of the waveform 42.

Two resistor-capacitor series circuits, one circuit consisting of a capacitor 29 and a resistor 33 and the other circuit consisting of a capacitor 30 and a resistor 35, are parallel connected between the plate of the tube 7 by leads 26, 27 and 28, and the ground reference such that the resistor terminals of the circuits are connected to the ground reference. The values of these components are chosen such that the circuits will have time constants many times greater than the durations of the excursions. The amounts of energy being stored on the capacitors 29 and 30 during the non-conducting excursions of the waveform 42 must be equal to the amounts of energy being discharged therefrom during the conducting excursions. As energy is a function of current multiplied by time of the current flowing, an excursion having a less duration than a second excursion will have a greater current than the second excursion. Consequently, the voltages developed across the resistors 33 and 35 will be greater when the durations are below the average durations and smaller when the durations are above the average durations.

Advantage is taken of this phenomenon by placing peak-riding vacuum tube voltmeters across the resistors 33 and 35. One peak-riding voltmeter, consisting of a tube 31, a resistor 34 and a capacitor 38, is connected for functioning on the positive peaks of the voltage developed across the resistor 33, while the other voltmeter, consisting of a tube 32, a resistor 36 and a capacitor 40, is connected for functioning on the negative peaks of the voltage developed across the resistor 35. The outputs of the voltmeters are connected together through resistors 37 and 39, which are of equal value, so that the voltage obtained at the junction of the resistors 37 and 39 is the difference between the two outputs. This difference voltage is amplified and reversed in polarity by the D. C. amplifier containing the tube 6, and is then applied to the grid of the tube 7, thereby correcting for the pulse duration difference.

In a closed loop system, whereby a correcting means is obtained from a discrepancy between an existing output and a desired output, and the correcting means is necessary to force the existing output to agree with the desired output, it is necessary to have a discrepancy in order to have a correcting means. The degree of the discrepancy will be determined by the sensitivity of the correcting device and the magnitude of the correcting means applied thereto.

Obviously, as the circuit described supra for maintaining equal pulse durations is a closed loop of this type, complete correction is not possible, but, by the proper design of the circuitry, this error may be reduced to within the desired limits.

There remains now to derive the frequency doubled pulse train from the multivibrator. This is accomplished by generating pulses coincident with the leading edge of each excursion and additively combining them into a single pulse train.

The output of tube 7 is applied by leads 26 and 43 and condenser 44 to the anode of a rectifier 45. The output of tube 8 is applied by lead 46 and condenser 47 to the anode of a rectifier 48. The cathodes of the two rectifiers are directly connected and their circuits are completed through resistors 49 and 50 and the common resistor 51. The common cathode lead is connected to the control grid of a tube 52 connected as a cathode follower.

Since the output waveform of each stage of a multivibrator is a reversal of that of the other stage, the condensers 44 and 47 apply to the anodes of their respective rectifiers 45, 48, positive pulses marking the leading edges of respective alternate excursions of the multivibrator output. They also apply negative pulses marking the trailing edges of these excursions but these produce no output from the rectifier circuits. Rectified positive output pulses from both rectifiers appear in the common cathode circuit and are applied to the cathode follower tube 52, thus producing a series of pulses 53 having twice the frequency of the trigger pulse train 16 applied to the multivibrator.

The following component values have proven satisfactory in an embodiment of the invention similar to Fig. 1 and are given by way of example.

| Resistors: | Ohms |
|---|---|
| 9 | 3,300 |
| 11 | 27,000 |
| 12 | 1,000,000 |
| 14 | 15,000 |
| 15 | 8,200 |
| 17 | 330 |
| 21 | 390,000 |
| 22 | 100,000 |
| 23 | 39,000 |
| 33, 35 | 220,000 |
| 34, 36 | 1,000,000 |
| 37, 39 | 1,000,000 |
| 49, 50 | 56,000 |

| Condensers: | Micro-microfarads |
|---|---|
| 10 | 1,800 |
| 29, 30 | 10,000 |
| 38, 40 | 500,000 |
| 44, 47 | 33 |

| Tubes: | Type |
|---|---|
| 6, 52 | 12AT7 |
| 7, 8 | 6AH6 |
| 31, 32, 45, 48 | 6AL5 |

A circuit constructed in accordance with Fig. 1 has succeeded in stabilizing the doubled output to the extent that a variation of sixty microseconds in the period of the basic pulse train resulted in a difference of only one microsecond between alternate pulse periods in the doubled train.

The multivibrator circuits disclosed lends itself particularly well to the requirements of the invention since the plates of the circuit do not participate in the multivibrator action and this action is thus not affected by the load placed upon them by the operations on the output. Other forms of multivibrator circuits may, however, be utilized.

What is claimed is:

1. Means to maintain substantial equality between the durations of the excursions of the waveform of a monostable multivibrator, comprising: means having the output of said multivibrator applied thereto, the last named means comparing the durations of said excursions and deriving from said comparison a direct current voltage having an amplitude and polarity which are functions of said durations, and means applying said direct current voltage to said multivibrator as bias voltage to cause said durations to become substantially equal.

2. Means to maintain substantial equality between the durations of the excursions of the waveform of a monostable multivibrator, comprising: means connected to the output of said multivibrator, said means producing oppositely polarized voltages, the amplitudes of said oppositely polarized voltages being a function of said durations of said excursions in said output of said multivibrator, a pair of peak riding circuits connected to the output of said means so as to produce voltages indicating the maximum values thereof in the positive and negative sense, means for differentially combining said produced voltages, and means for applying the resultant of said combined voltages to said multivibrator as bias voltage to cause said durations to become substantially equal.

3. Means to double the repetition frequency of a train of uniformly spaced pulses, comprising: a monostable multivibrator operated by said pulses, the output of said multivibrator being a waveform of excursions of rectangular form, means having said output connected thereto, said means comparing the durations of said excursions and deriving from said comparison a direct current voltage having an amplitude and polarity which are functions of said durations, means for applying said direct current voltage to said multivibrator as biasing voltage, said biasing voltage producing the effect of substantially equalizing said durations, and means operating on said excursions of substantially equalized durations such that a pulse is produced coincident with each change in polarity of said excursions, the repetition frequency of said last mentioned pulses being double the repetition frequency of said train of pulses.

4. Means to double the repetition frequency of a train of uniformly spaced pulses, comprising: a monostable multivibrator operated by said pulses, the output of said multivibrator being a waveform of excursions of rectangular form, means having the output of said multivibrator applied thereto, said means producing oppositely polarized voltages, the amplitudes of said oppositely polarized voltages being a function of the durations of said excursions in said output of said multivibrator, a pair of peak riding circuits having said oppositely polarized voltages applied thereto so as to produce voltages indicating the maximum values of said oppositely polarized voltages in the positive and negative sense, means for combining said voltages from said peak riding circuits, means for applying said combined voltages to said multivibrator as bias voltage to cause said durations to become substantially equal, and means operating on said excursions of substantially equalized durations such that a pulse is produced for each change in sense of said excursions, the repetition frequency of said last mentioned pulses being double the repetition frequency of said train of pulses.

5. Means to maintain substantial equality between the durations of the excursions of the waveform of a monostable multivibrator, comprising: a parallel combination of two identical series circuits connected between an output point of said multivibrator and a ground reference, each of said series circuits containing a capacitor and a resistor, said capacitors and said resistors being of such values that the flow of energy from or to said capacitors will be continued throughout any of said excursions, two peak riding voltmeters, one of said meters being connected across one of said resistors to function on positive voltage peaks and the other of said meters being connected across the other of said resistors to function on negative voltage peaks, a network consisting of two resistors in a series combination connected between the outputs of said meters such that a differential potential is obtained at the junction of the last of said resistors, means amplifying said differential voltage, and means applying said amplified voltage in the proper polarity sense as a biasing potential for said multivibrator such that said durations of said excursions will become substantially equal.

6. Means to maintain substantial equality between the durations of the excursions of the waveform of a monostable multivibrator, comprising: a parallel combination of two identical series circuits connected between an output of said multivibrator and a ground reference, each of said series circuits containing a plurality of impedance means, said impedance means being of such values that a current will exist throughout any of said excursions, two peak riding voltmeters, one of said meters being connected across one of said impedance means in one of said series circuits to function on positive peaks of the voltage developed thereacross and the other of said meters being connected across the corresponding impedance means in the other of said series circuits to function on negative peaks of the voltage developed thereacross; a network consisting of two resistors in a series combination being connected between the outputs of said meters such that a differential potential is obtained at the junction of the last of said resistors, means amplifying said differential voltage and means applying said amplified voltage in the proper polarity sense as a biasing potential to said multivibrator such that said durations of said excursions will become substantially equal.

References Cited in the file of this patent

UNITED STATES PATENTS 2,558,371  Nibbe _____ June 26, 1951
2,561,066  Moody _____ July 17, 1951